United States Patent [19]

Diederich, Jr.

[11] Patent Number: 5,291,969
[45] Date of Patent: Mar. 8, 1994

[54] ADAPTER MECHANISM FOR FLUID COOLING AND FILTERING

[76] Inventor: Paul W. Diederich, Jr., 633 Hunters Trail, Glendora, Calif. 91740

[21] Appl. No.: 899,300

[22] Filed: Jun. 16, 1992

[51] Int. Cl.⁵ .................................... F01M 5/00
[52] U.S. Cl. .................... 184/6.22; 184/6.24; 184/104.1; 184/104.3; 285/12; 123/196 R; 123/196 AB
[58] Field of Search ............ 184/6.22, 6.24, 104.1, 184/104.2, 104.3; 285/12, 41, 351; 123/196 R, 196 AB, 198 E

[56] References Cited

U.S. PATENT DOCUMENTS

| | | | |
|---|---|---|---|
| 869,662 | 10/1907 | Snyder | 285/12 |
| 2,489,928 | 11/1949 | Phillips | 285/12 |
| 4,193,442 | 3/1980 | Vian | 123/196 AB |
| 4,266,813 | 5/1981 | Oliver | 285/12 |
| 4,278,275 | 7/1981 | Diederich, Jr. | 285/12 |
| 4,335,688 | 6/1982 | Diederich, Jr. | 184/104.3 |
| 4,976,854 | 12/1990 | Yano et al. | 184/6.24 |
| 5,014,775 | 5/1991 | Watanabe | 184/104.3 |
| 5,066,391 | 11/1991 | Faria | 184/6.24 |

*Primary Examiner*—Thomas E. Denion
*Attorney, Agent, or Firm*—Boniard I. Brown

[57] ABSTRACT

An adapter mechanism for use between an engine and an oil cooler manifold, includes a special nut having internal threads for screw-on engagement with an externally threaded engine boss. External threads on the nut mate with threads on a central wall portion of an associated oil cooler manifold to operatively connect the manifold with oil passages in the engine block. Differently dimensioned nuts may be selectively utilized to connect a given manifold with a range of different engines. An annular adapter plate is positioned between the manifold and engine to provide sealed passage connections to or from the manifold passages.

7 Claims, 1 Drawing Sheet

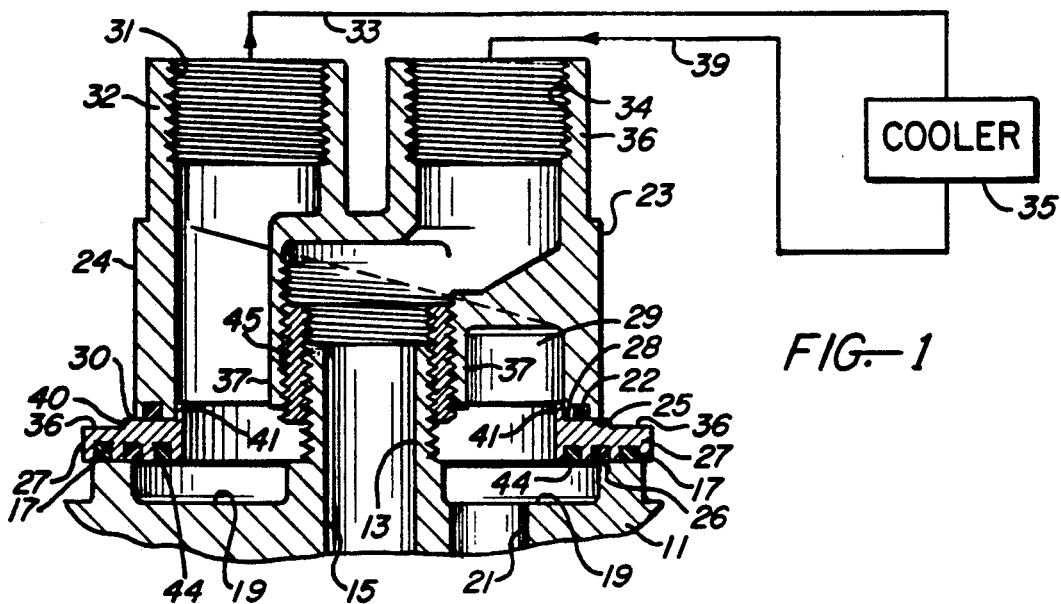
FIG.—1
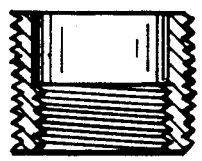
FIG.—5
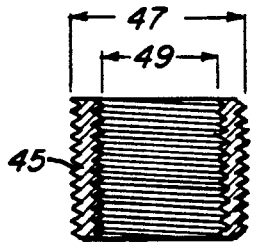
FIG.—3
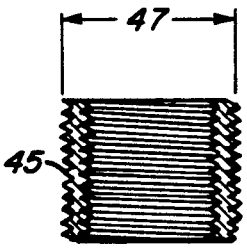
FIG.—4
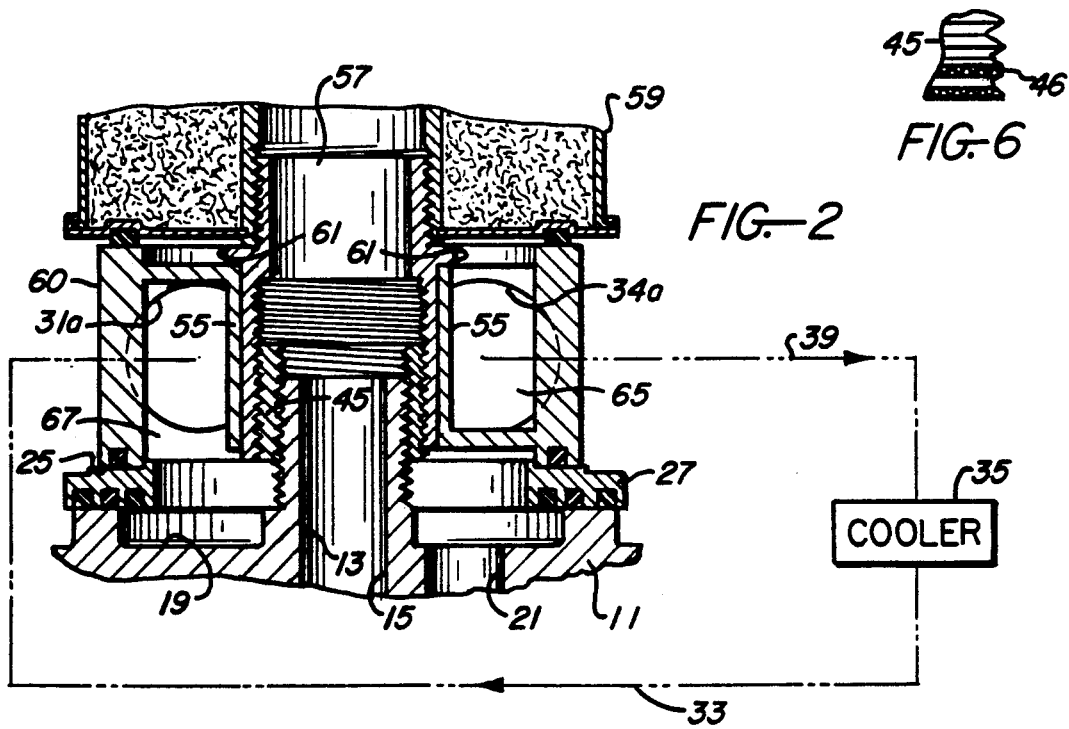
FIG.—2
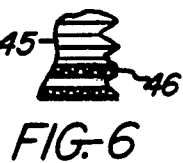
FIG.—6

ADAPTER MECHANISM FOR FLUID COOLING AND FILTERING

BACKGROUND OF THE INVENTION

1. Field of the Invention

The present invention relates generally to engine lubrication systems, and particularly to devices for connecting an external oil cooler to an engine lubrication circuit, whereby the lubricating oil is kept reasonably cool under high load conditions.

2. Prior Art

My U.S. Pat. No. 4,335,688 discloses an internally partitioned manifold adapted to be interposed between an engine and an oil filter. The manifold has threaded openings for operatively mounting external oil line connecting to an external oil cooler. Oil can thus flow from the engine through the cooler and filter, and then back into the engine for recirculation through the engine to perform its lubricating action.

The manifold disclosed in U.S. Pat. No. 4,335,688 is clamped to the engine by a special connector which has a cylindrical section extending through the manifold. The cylindrical section is internally threaded for connection with an externally threaded hollow boss extending from one face of the engine. An hexagonal enlargement on the connector defines a shoulder which acts as a clamp to securely hold the manifold on the engine. The special connector further includes an externally threaded tubular section that serves as mounting means for a spin-on oil filter.

My U.S. Pat. No. 4,278,275 discloses an adapter having an internal hollow boss which is internally threaded for threaded connection with an externally threaded boss on an engine, whereby the adapted can be screwed down against an annular engine surface. Two passageways through the adapter provide for the circulation of engine oil through an external cooler. The adapter has two concentric O-ring grooves therein for sealing engagement with the engine surface. Either one (or both) of the O-ring grooves may be used for sealing purposes, depending upon variations in engine surface dimension.

Other manifolds have been developed for direct connection to a hollow engine boss, without using the above-described special connector. These other manifolds have integral internally threaded central walls, whereby the manifold can be turned bodily about the axis of the mounting boss on the engine in order to mount the manifold on the engine. Such manifolds may have provisions thereon for mounting a spin-on oil filter.

Different engines have differently dimensioned hollow mounting bosses, which can relate to the outside diameter of the mounting boss or the thread configuration. Sometimes the differences relate to the measurement system used in engine manufacture, e.g., English measurement or metric measurement. The differences may relate to the thread pitch, i.e., the threads per inch. The boss differences make it somewhat difficult to design a universal manifold construction, i.e., a manifold that will fit all or most engines.

SUMMARY OF THE INVENTION

The present invention relates to an adapter mechanism for coupling an engine oil circulation system to an external manifold associated with an external oil cooler. The invention is concerned primarily with cooling devices for engine lubricating oil, although the invention could also be used with coolers for engine transmission oil.

A principal purpose of the invention is to provide an adapter mechanism for use as a universal connector device between an oil cooler manifold and a range of different engines, with a minimum of parts substitution required to achieve the universal connector function. In one form of the invention, the adapter mechanism comprises an annular plate adapted to seat on an annular land surface of the engine in surrounding relation to a hollow threaded boss extending from the engine. A flange extends from an inner edge of the annular plate to pilot the plate to a predetermined position concentric with the hollow boss.

A special nut is threaded on the hollow boss to form a boss enlargement. External threads on the nut provide a threaded mounting surface for an oil cooler manifold.

In the preferred practice of the invention, a number of differently configured nuts may be provided for selective use on differently sized engine bosses. It thus becomes possible to mount a given oil cooler manifold on a range of different engines, through selective use of different sized mounting nuts. The mounting nuts are relatively low cost devices which can be provided in a manifold-attachment kit without significant extra expense to the user.

BRIEF DESCRIPTION OF THE DRAWINGS

FIG. 1 is a fragmentary sectional view illustrating an adapter mechanism of the present invention for coupling an oil cooler manifold to an engine;

FIG. 2 shows the adapter mechanism of FIG. 1 coupling a different oil cooler manifold to the engine; and FIGS. 3, 4 and 5 are sectional views taken through different connector nuts which may be used interchangeably in the FIG. 1 adapter mechanism; and FIG. 6 is a fragmentary elevational view of a connector nut of FIGS. 3, 4 or 5.

DESCRIPTION OF A PREFERRED EMBODIMENT OF THE INVENTION

Referring to the drawings, the fragmentary sectional view of FIG. 1 shows an engine 11 having an externally threaded tubular boss 13 and a first oil passage 15 therethrough. An annular raised flat land surface 17 is concentric with the axis of boss 13, whereby an annular recess 19 is formed between the boss and the raised land surface. A second oil passage 21 extends from recess 19 into the engine block. Oil passages 15 and 21 form parts of a closed oil circulation system for lubricating the engine. For example, oil may flow into the engine through passage 15 and out of the engine through passage 21. An conventional spin-on oil filter (not shown) may be mounted on the engine, e.g., by screwing the filter onto boss 13 so that an annular gasket on the filter seals against land surface 17. Passages 21 and 15 direct the oil through the filter.

The present invention is particularly concerned with an adapter mechanism for operatively connecting oil passages 15 and 21 to an oil manifold 23 (after removal of the spin-on filter). The illustrated oil manifold comprises a cylindrical block structure 24 having a flat end face 25 seatable on an annular adapter plate 27. An annular recess or passage 29 is defined in end face 25 to connect with an internally threaded bore 31 in boss 32. A fitting (not shown) may be threaded into bore 31 to connect the bore to a line 33 which connects to an external oil cooler 35.

Block structure 24 includes a central tubular wall 37 defined by annular recess 29. The space circumscribed by wall 37 communicates with a second threaded bore 34 in a second boss 36. Threaded bore 34 forms a mounting means for a second oil line 39 communicating with cooler 35. With the illustrated manifold construction, oil can flow from passage 21 and recess 29 into bore 31, thence through line 33 to the oil cooler 35. The cooled oil returns to the engine through oil line 39 into bore 34 and thence into oil passage 15 in engine bore 13. If desired, an oil filter may be incorporated in line 39.

The purpose of adapter plate 27 is to enable a given size manifold to fit different engine surface dimensions. As seen in FIG. 1, plate 27 enables manifold 23 to mate with land surface 17, even though end face 25 of the manifold has a different diameter than land surface 17.

As hereinbefore noted, plate 27 is sandwiched between block structure 24 and engine surface 17. Plate 27 has an upstanding flange 41 on its inner edge for disposition within block structure 24, whereby the plate is piloted to a predetermined position on land surface 17. Plate 27 is preferably concentric with the axis of tubular boss 13 so that its upper face 30 is properly oriented to mate with end face 25 on manifold 23. The use of a flange on the inner edge of an adapter plate is believed to represent a new means of piloting an adapter plate to a desired position on the engine. The flange may be relatively thin, thus not to detract appreciably from the flow area defined between the plate inner edge and the outer surface of engine boss 13. There are no spokes in plate 27 to restrict the flow.

As shown in FIG. 1, adapter plate 27 has sealed connections with manifold 23 and with land surface 17. Manifold 23 has an O-ring 22 seatable against the upper face 28 of plate 27. The adapter plate has at least one groove in its lower face 44 for accommodating an O-ring 26. The drawings show three O-ring grooves in the lower face 44 of plate 27 for alternative accommodation of different size O-rings. The different size O-rings are used to mate the adapter plate to differently dimensioned land surfaces 17, as more particularly described in my earlier U.S. Pat. No. 4,335,688.

Manifold 23 is secured to plate 27 and the engine by means of a nut 45. Both the inner and outer side surfaces of the nut are threaded, whereby the nut is threadable onto boss 13, and tubular manifold wall 37 is threadable onto the nut. The attachment process preferably involves first screwing nut 45 fully into tubular wall 37 so that the lower end face of the nut is slightly below the lower end of wall 37. Then, manifold 23 is turned bodily so that nut 45 threads onto the threaded surface of engine boss 13.

Preferably, the friction fit of nut 45 in tubular wall 37 is tighter than the thread fit of nut 45 on engine boss 13. FIG. 6 illustrates one expedient for ensuring a tight fit of nut 45 in wall 37. The lowermost eternal thread on the nut is subjected to a knurling operation, as at 46, whereby the land surface of the thread is deformed radially inwardly so that thread is slightly thicker in the axial direction. Because the deformed thread 46 is somewhat thickened axially, it has a relatively tight fit in the female threads in tubular wall 37. With nut 45 tightly screwed into wall 37, the nut becomes a part of the manifold. Should it be necessary to remove the manifold from the engine, the manifold can be manually unscrewed relative to boss 13; nut 45 will remain attached to the manifold during the unscrewing operation. After the manifold has been removed from the engine boss 13, nut 45 may be manually unscrewed from the manifold if it becomes necessary to replace the nut with a different sized nut (as shown in FIGS. 3 through 5).

The knurling (deforming or squashing) of the external thread on nut 45 is performed only at the lower end of the nut, i.e., for one or two turns of the thread length. The localized knurling ensures that the nut will be threaded fully into the manifold and then locked to the manifold wall 37 by a tight frictional fit of the deformed knurled thread area on the wall 37 thread surface.

Nut 45 serves as a variable radial thickness transition element between engine boss 13 and manifold central wall 37, whereby a given manifold 23 may be used with different engines having a different boss 13 dimensions. FIGS. 3 and 4 show two different nuts which may be used selectively with the FIG. 1 manifold. Other nuts having other dimensions may also be utilized. Referring to FIGS. 3 and 4, each nut has the same outer diameter 47 and the same thread pitch on its outer thread surface. However, the inner diameter 49 of the FIG. 3 nut is slightly smaller than the corresponding internal diameter of the FIG. 4 nut. Also, the FIG. 3 nut has a coarser inner thread than the inner thread of the FIG. 4 nut.

FIG. 5 illustrates a third nut construction which may be interchangeably used with the nuts of FIGS. 4 and 5. In the FIG. 5 nut, the nut is internally threaded only part way along the nut length. The thread surface length is appreciably reduced, preferably to less than one-half the length of a fully threaded surface, whereby a given thread can effectively mate with more than one size thread on boss 13, e.g., an English size thread and the nearest metric size thread. The shortened thread length can come within the plus or minus tolerance ranges and thread fit dimensions of multiple threads, thereby increasing the usefulness of the nut as a transition element between a given thread pitch on tubular wall 37 and a different thread pitch on boss 13.

By selectively using different nuts, it is possible to mount a given manifold on a range of different engines, i.e., engines having different boss 13 diameters or different thread sizes.

It will be seen from FIG. 1 that plate 27 has an outer annular face area 36 spaced below the plane of the plate upper face 30. Face area 36 is joined to the plate upper face by an annular shoulder 40. Face area 36 has the potential for serving as an alternate seating surface for use with a larger sized manifold 30—i.e., larger than the manifold shown in FIG. 1. With such a larger-sized manifold face area 36, plate 27 could seat against the end face of the manifold, with shoulder 40 extending into the manifold to act as a pilot surface (similar to the action of flange 41). Plate 27 has a stepped upper surface to provide two concentric manifold-engagement surfaces 30 and 36, and two pilot surfaces 41 and 40, whereby the plate could be used with two differently sized manifolds.

FIG. 2 illustrates the nut and adapter plate used with a slightly different manifold construction 60. The manifold has the same construction as the manifold shown in my earlier U.S. Pat. No. 4,335,688.

As shown in FIG. 2, manifold 60 has a central annular wall 55 which defines a cylindrical inner surface sized to receive a hollow tubular connector 57. The lower end portion of the connector is internally threaded to mate with the external threads on nut 45. The upper end portion of connector 57 is externally threaded to mesh with threads formed on the central tubular wall of a conventional oil filter 59. Connector 57 thus serves as a mounting means for the oil filter.

An external enlargement 61 is formed on tubular connector 57 for use in screwing the connector onto nut 45. In plan configuration, enlargement 61 is hexagonal, whereby a socket wrench may be applied to the enlargement to screw connector 57 into a tight fit on nut 45. Enlargement 61 serves as a clamp for securely retaining the manifold on the engine and on annular plate 27.

Manifold 60 has two circular threaded bores 31a and 34a. The manifold is internally partitioned so that bore 31a communicates with the lower face 25 of the manifold, whereas bore 34a communicates with the upper face 63 of the manifold. Oil can circulate from oil passage 15 in boss 13 upwardly through the oil filter, and then downwardly into semi-circular recess 65 which communicates with bore 34a. Oil can then flow from bore 34a through external line 39, cooler 35 and line 33 back into threaded bore 31a. Semi-circular recess 67 in the manifold returns the oil to engine oil passage 21.

FIGS. 1 and 2 show representative oil cooler manifold constructions suited for use with the adapter mechanism of this invention. The invention is concerned primarily with the features of adapter plate 27 and special nut 45, whereby a given manifold may be operatively connected to a range of different engine boss designs (sizes). A plurality of different nuts 45 may be provided in a manifold installation kit at relatively slight additional expense. The adapter mechanism is designed to maintain large size passages into and out of the associated manifold to achieve a satisfactory oil flow through the cooler.

Thus there has been shown and described a novel adapter mechanism for fluid cooling and filtering which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventor claims:

1. An adapter mechanism for coupling an engine oil circulation system to an external oil cooler manifold structure, wherein an engine has an externally threaded hollow boss constituting a first oil passage, an annular land surface concentric with said hollow boss, an annular recess between the hollow boss and the land surface, and a second oil passage connected to said recess, said adapter mechanism comprising:
    a multiple thread surface nut threadable onto the hollow boss to form a threaded mounting surface for said manifold structure,
    said nut having inner threads engageable with the threads on the hollow boss, and outer threads adapted to mesh with internally threaded connector means on said manifold,
    an annular plate sandwiched between the manifold structure and the engine land surface, said annular plate having an outer edge and an inner edge, and
    a flange projecting from said inner edge for piloting the plate to a predetermined position on the land surface.

2. An adapter mechanism according to claim 1, and further comprising:
    at least a second nut having the same dimensions as the first mentioned nut except that the inner threads thereof are differently dimensioned, whereby the two nuts are usable on engine bosses having different thread dimensions.

3. An adapter mechanism according to claim 2, wherein:
    said second nut has inner threads extending only partially along the length of the nut, whereby the nut is usable on different engine bosses having different thread dimensions.

4. An adapter mechanism according to claim 1, wherein:
    said annular plate has an annular flat face seatable against said engine land surface, and a plural number of concentric annular O-ring grooves defined in said annular flat face, whereby the annular plate can be operatively utilized on a range of engines.

5. An adapter mechanism for coupling an engine oil circulation system to an external oil cooler manifold structure, wherein an engine has an externally threaded hollow boss constituting a first oil passage, an annular land surface concentric with said hollow boss, an annular recess between the hollow boss and the land surface, and a second oil passage connected to said recess, said adapter mechanism comprising:
    a multiple thread surface nut threadable onto the hollow boss to form a threaded mounting surface for said manifold structure,
    an annular plate sandwiched between the manifold structure and the engine land surface, said annular plate having an outer edge and an inner edge,
    said annular plate having a stepped manifold structure engagement surface to provide two concentric seating surfaces for engagement with two differently sized manifold structures, and
    a flange projecting from said inner edge for piloting the plate to a predetermined position on the land surface.

6. An adapter mechanism according to claim 5, wherein:
    said concentric seating surfaces are in different planes, said annular plate has an annular shoulder joining the two concentric seating surfaces, and
    said annular shoulder constitutes said pilot for the annular plate when the larger diameter seating surface is operatively engaged with the manifold structure.

7. An adapter mechanism for coupling an engine oil circulation system to an external oil cooler manifold structure, wherein an engine has an externally threaded hollow boss constituting a first oil passage, an annular land surface concentric with said hollow boss, an annular recess between the hollow boss and the land surface, and a second oil passage connected to said recess, said adapter mechanism comprising:
    a multiple thread surface nut threadable onto the hollow boss to form a threaded mounting surface for said manifold structure,
    a section of the nut outer thread being deformed, whereby the nut has a tight friction fit on a manifold connector means and a loose friction fit on the hollow boss,
    an annular plate sandwiched between the manifold structure and the engine land surface, said annular plate having an outer edge and an inner edge, and
    a flange projecting from said inner edge for piloting the plate to a predetermined position on the land surface.

* * * * *